US012567335B2

(12) United States Patent
Pesquet-Popescu et al.

(10) Patent No.: US 12,567,335 B2
(45) Date of Patent: Mar. 3, 2026

(54) OPTIMIZED AIR TRAFFIC MANAGEMENT FOR UNMANNED AERIAL VEHICLES

(71) Applicant: THALES, Courbevoie (FR)

(72) Inventors: Béatrice Pesquet-Popescu, Rungis (FR); Nicolas Martin, Rungis (FR); Olivier Réa, Rungis (FR); Andrei Purica, Rungis (FR)

(73) Assignee: THALES, Courbevoie (FR)

( * ) Notice: Subject to any disclaimer, the term of this patent is extended or adjusted under 35 U.S.C. 154(b) by 320 days.

(21) Appl. No.: 17/733,861

(22) Filed: Apr. 29, 2022

(65) Prior Publication Data

US 2022/0351629 A1 Nov. 3, 2022

(30) Foreign Application Priority Data

May 3, 2021 (FR) ...................................... 2104644

(51) Int. Cl.
| | |
|---|---|
| *G08G 5/55* | (2025.01) |
| *G06N 3/08* | (2023.01) |
| *G08G 5/30* | (2025.01) |
| *G08G 5/56* | (2025.01) |
| *G08G 5/57* | (2025.01) |

(Continued)

(52) U.S. Cl.
CPC ................. *G08G 5/55* (2025.01); *G06N 3/08* (2013.01); *G08G 5/30* (2025.01); *G08G 5/56* (2025.01); *G08G 5/57* (2025.01); *G08G 5/59* (2025.01); *G08G 5/80* (2025.01)

(58) Field of Classification Search
CPC ...... G08G 5/006; G08G 5/003; G08G 5/0043;

G08G 5/0069; G08G 5/045; G08G 5/0013; G08G 5/0026; G08G 5/0034; G08G 5/0082; G06N 3/08; G01C 21/20

See application file for complete search history.

(56) References Cited

U.S. PATENT DOCUMENTS

| | | |
|---|---|---|
| 8,924,069 B1 | 12/2014 | Kaneshige et al. |
| 10,679,509 B1 | 6/2020 | Yarlagadda |

(Continued)

FOREIGN PATENT DOCUMENTS

| | | |
|---|---|---|
| EP | 2 492 856 A1 | 8/2012 |
| FR | 3 099 282 A1 | 1/2021 |

OTHER PUBLICATIONS

The Search Report issued in Singaporean Patent Application No. 10202204643Y dated Oct. 17, 2025.

*Primary Examiner* — Navid Z. Mehdizadeh
*Assistant Examiner* — Micah Chuen-Him Cheng
(74) *Attorney, Agent, or Firm* — BakerHostetler

(57) ABSTRACT

A computer-implemented method includes receiving a trajectory request from an unmanned aerial vehicle, the request comprising: an initial point; a final point; at least one manoeuvrability parameter of the unmanned aerial vehicle; computing a plurality of optimized 4D trajectories between the initial point and the final point, complying with the at least one manoeuvrability parameter, and avoiding obstacles in an airspace, each 4D trajectory being associated with a performance score; a flight simulator simulating the plurality of 4D trajectories in order of decreasing performance score, until a 4D trajectory is considered to be flyable by the flight simulator; sending the trajectory considered to be flyable by the flight simulator to the unmanned aerial vehicle.

12 Claims, 5 Drawing Sheets

(51) Int. Cl.
G08G 5/59 (2025.01)
G08G 5/80 (2025.01)

(56) References Cited

U.S. PATENT DOCUMENTS

| | | | |
|---|---|---|---|
| 2010/0292871 A1* | 11/2010 | Schultz | G08G 5/045 342/29 |
| 2012/0215433 A1* | 8/2012 | Subbu | G08G 5/0043 701/120 |
| 2019/0184561 A1 | 6/2019 | Yip et al. | |
| 2020/0302193 A1* | 9/2020 | Nagata | B60W 30/0956 |
| 2020/0346769 A1 | 11/2020 | Knapp et al. | |
| 2020/0391384 A1 | 12/2020 | Cohen et al. | |
| 2021/0124352 A1 | 4/2021 | Candido et al. | |
| 2021/0241634 A1* | 8/2021 | Sarim | G08G 5/0013 |
| 2022/0254259 A1 | 8/2022 | Martinez et al. | |
| 2023/0237917 A1* | 7/2023 | Schuppenhauer | G08G 5/045 701/120 |

* cited by examiner

OPTIMIZED AIR TRAFFIC MANAGEMENT FOR UNMANNED AERIAL VEHICLES

CROSS-REFERENCE TO RELATED APPLICATION

This application claims priority to foreign French patent application No. FR 2104644, filed on May 3, 2021, the disclosure of which is incorporated by reference in its entirety.

FIELD OF THE INVENTION

The present invention relates to air traffic management. More specifically, the present invention relates to the management of air traffic comprising unmanned aerial vehicles.

BACKGROUND

Unmanned aerial vehicles, also called drones, are increasingly present in airspaces. Drones may be piloted by a remote operator, or piloted autonomously. The lack of a pilot in the drone makes it possible to contemplate new forms for them in comparison with piloted aircraft. For example, a drone may be far smaller than a piloted aircraft. This makes it possible to contemplate new applications, such as parcel delivery by drones. The cost of operating a drone is generally lower than that of a piloted aircraft, since it does not require the presence of a pilot on board, and may be miniaturized.

Drones are thus increasingly present in airspace, in particular at low altitudes and in urban environments.

In order to ensure the safety of drone navigation, it is necessary to deploy air traffic control solutions that make it possible notably to provide each drone with trajectories that do not contain any risks of conflict with obstacles (which may be for example relief, buildings or other aircraft).

Conventional air traffic control systems are based on an air traffic controller supervising an airspace, said air traffic controller visualizing all of the trajectories of aircraft and interacting with the pilots of the aircraft.

Conventional air traffic control solutions cannot be applied to an airspace containing a large number of drones, for many reasons.

First of all, it should be expected that drones generate far denser air traffic than piloted aircraft. In particular, in an urban environment, a large number of drones may share an airspace, thus leading to a very high concentration of drones in the space. In addition, drones fly at a low altitude, and often close to obstacles (buildings, other drones, relief, etc.), thereby requiring a faster decision-making process for interacting with drones. A human air traffic controller therefore risks being unable to analyse the air situation fast enough, and to propose safe trajectories to the drones in good time.

Moreover, drones might not be piloted by a human operator, or piloted by a remote operator who is not necessarily an expert in air navigation. Communication practices between air traffic controllers and airline pilots therefore cannot be transposed directly to exchanges between air traffic control and drones.

There is therefore a need for an air traffic control system capable of automatically optimizing trajectories in an airspace containing a large number of unmanned aerial vehicles.

SUMMARY OF THE INVENTION

To this end, one subject of the invention is a computer-implemented method comprising: receiving a trajectory request from an unmanned aerial vehicle, said request comprising: an initial point; a final point; at least one manoeuvrability parameter of the unmanned aerial vehicle; computing a plurality of optimized 4D trajectories between the initial point and the final point, complying with the at least one manoeuvrability parameter, and avoiding obstacles in an airspace, each 4D trajectory being associated with a performance score; a flight simulator simulating said plurality of 4D trajectories in order of decreasing performance score, until a 4D trajectory is considered to be flyable by the flight simulator; sending said trajectory considered to be flyable by the flight simulator to said unmanned aerial vehicle.

Advantageously, the trajectory request comprises a series of waypoints defining a target route.

Advantageously, a 4D trajectory is optimized in accordance with one or a combination of the following parameters: minimizing a length of the trajectory while passing through a series of waypoints in a predefined order; minimizing a number of unmanned aerial vehicle manoeuvres over the trajectory; complying with the at least one manoeuvrability parameter; avoiding obstacles in accordance with a criticality level of the obstacles; complying with a safety corridor around a target route.

Advantageously, the method comprises adding the trajectory considered to be flyable to the obstacles in order to compute the trajectory of other aircraft in the airspace.

Advantageously, computing a 4D trajectory of the plurality of optimized 4D trajectories comprises: receiving a three-dimensional representation of the airspace at the time when the method is executed; encoding the airspace configured so as to determine a smaller representation of the airspace by applying a recurrent autoencoder to said three-dimensional representation of the airspace at said time when the method is executed; determining an action to be implemented by said unmanned aerial vehicle, by implementing a deep reinforcement learning algorithm in order to determine said action based on said smaller representation of the airspace and on information relating to said unmanned aerial vehicle and/or to at least one other aircraft in the airspace.

Advantageously, said deep reinforcement learning algorithm is trained beforehand to approximate a reward function for a given representation of a scenario in the airspace at the time when the method is executed, said action corresponding to an optimum strategy that maximizes said reward function in the training phase, said reward function defining the performance score associated with the 4D trajectory.

Advantageously, said reward function associates a value with each triplet comprising an air situation at a first given time, an action taken at a given time, and an air situation at a second given time, said value being broken down into a plurality of penalties comprising: a positive penalty if the action taken at the given time has resolved a conflict, or a negative penalty if the action taken at the given time has not made it possible to resolve a conflict or has led to at least one other air conflict; a negative penalty if the action taken at the given time leads to a new trajectory that causes a detour; a positive penalty if the action taken at the given time leads to a new shorter trajectory; a negative penalty if the action taken at the given time makes it possible to resolve said air conflict and the resolution takes place close to the conflict; a negative penalty that increases with the number of actions taken to resolve said air conflict.

Advantageously, the sum of the negative penalty if the action taken at the given time has not made it possible to resolve a conflict or has led to at least one other air conflict depends on the criticality of said conflict or of said other air conflict.

Another subject of the method is a system comprising: at least one communication port able to communicate with an unmanned aerial vehicle; an access point to at least one information storage medium storing a definition of a set of obstacles in an airspace; at least one computing unit configured so as to execute a method according to one of the embodiments of the invention.

Another subject of the invention is a computer program product comprising computer code elements configured so as to execute a method according to one of the embodiments of the invention.

BRIEF DESCRIPTION OF THE DRAWINGS

Other features, details and advantages of the invention will become apparent on reading the description, which is given with reference to the appended drawings, which are given by way of example and in which, respectively.

DETAILED DESCRIPTION

Certain acronyms commonly used in the technical field of the present patent application might be employed in the course of the description. These acronyms are listed in the table below, notably with their corresponding expression and their meaning.

TABLE 1

| Acronym | Expression | Meaning |
|---|---|---|
| ATM | Air Traffic Management | All of the activities carried out to ensure the safety and fluidity of air traffic. |
| FL | Flight Level | In aeronautics, designates an altitude expressed in hundreds of feet above the 1013.25 hPa isobaric surface. |
| LSTM | Long Short Term Memory | Denotes a type of autoencoder. An LSTM autoencoder is a type of autoencoder capable of learning complex dynamics from the temporal scheduling of input sequences. |
| UAV | Unmanned Aerial Vehicle | Aircraft without a crew that is piloted in an automated or remote-controlled manner, generally denoted using the term "drone". |
| UTM | Unmanned aircraft system Traffic Management | ATM system developed for management of air traffic containing UAVs. |

Figure 1:
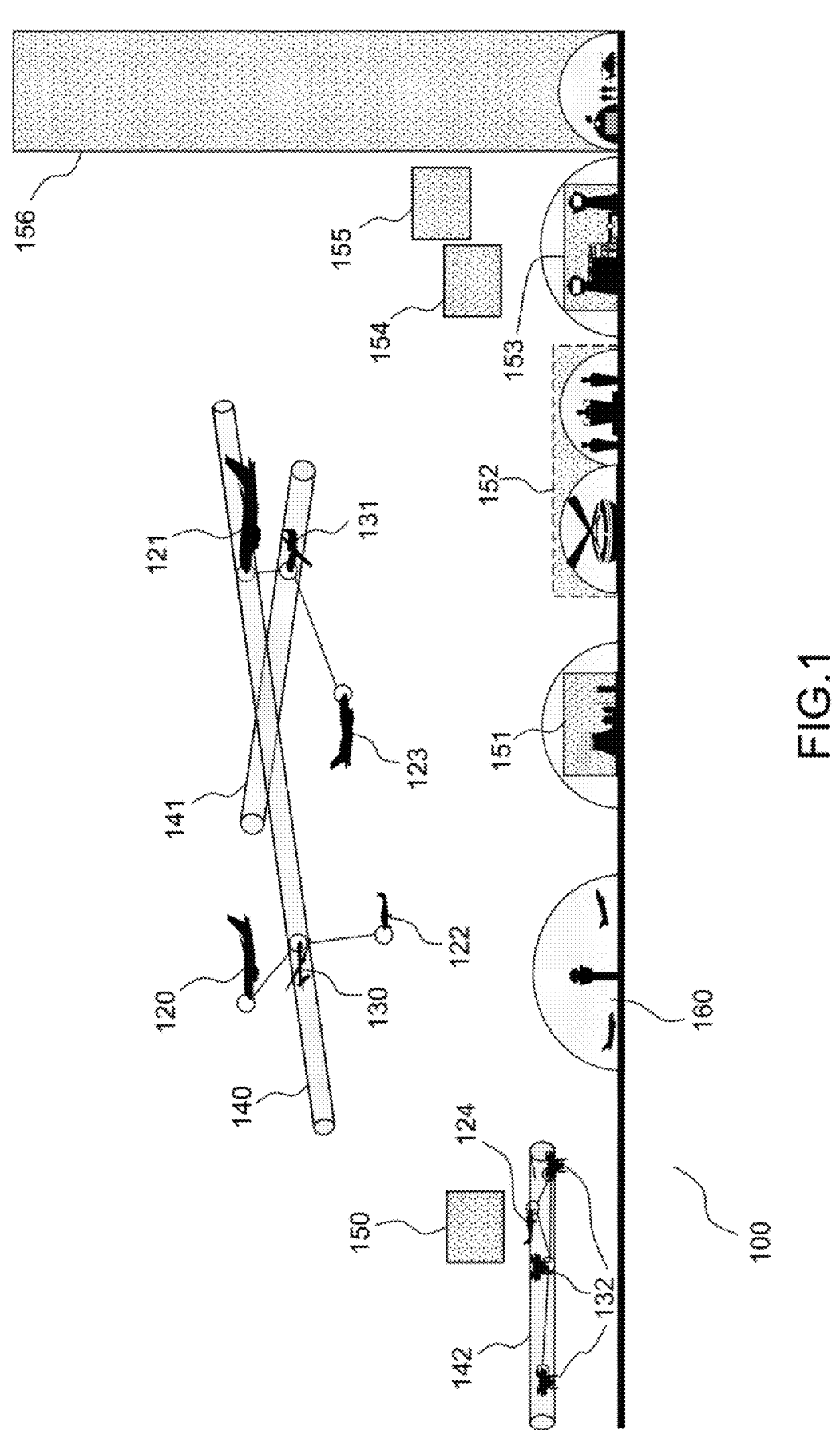
FIG. 1 shows one example of an airspace containing unmanned aerial vehicles, the invention being able to be implemented to control said airspace.

FIG. 1 shows one example of an airspace containing unmanned aerial vehicles, the invention being able to be implemented to control said airspace.

The airspace 100 is an airspace in which piloted aircraft 120, 121, 122, 123, 124 and unmanned aerial vehicles (also called drones or UAVs) 130, 131 and 132 coexist. The UAV

132 is shown in 3 positions, corresponding to 3 successive positions on its trajectory. The UAVs 130, 131 and 132 are respectively associated with safety corridors 140, 141 and 142 defining corridors around the trajectory of the UAVs in which there must not be any obstacles so that the UAVs are able to move safely.

The airspace also contains no-fly zones or obstacles, such as the zones 150, 151, 152, 153, 154, 155 or 156. These zones may comprise any type of zones in which flying is not desirable, such as a nuclear plant (zone 151) or a military base (zone 156). They may also comprise zones that are hazardous for aircraft, such as relief, buildings or zones of significant weather disruption. Depending on the zones, overflying may be forbidden only over certain altitude ranges, such as for example for zones 150 to 155, or over all altitudes, such as for zone 156. Forbidden zones may be defined permanently or temporarily.

The airspace 100 may be controlled by an air traffic control system, called UTM, when the aircraft being controlled are or include UAVs. The role of the UTM is to optimize the trajectories of the aircraft, notably UAVs, so that they do not present any danger (where appropriate, other parameters such as journey time or fuel consumption may be optimized), and to ensure that the aircraft correctly follow the trajectories. Verifying that the trajectories do not present any danger may integrate safety corridors 140, 141 and 142, for example by ensuring that these corridors do not come into contact with one another.

Figure 2:
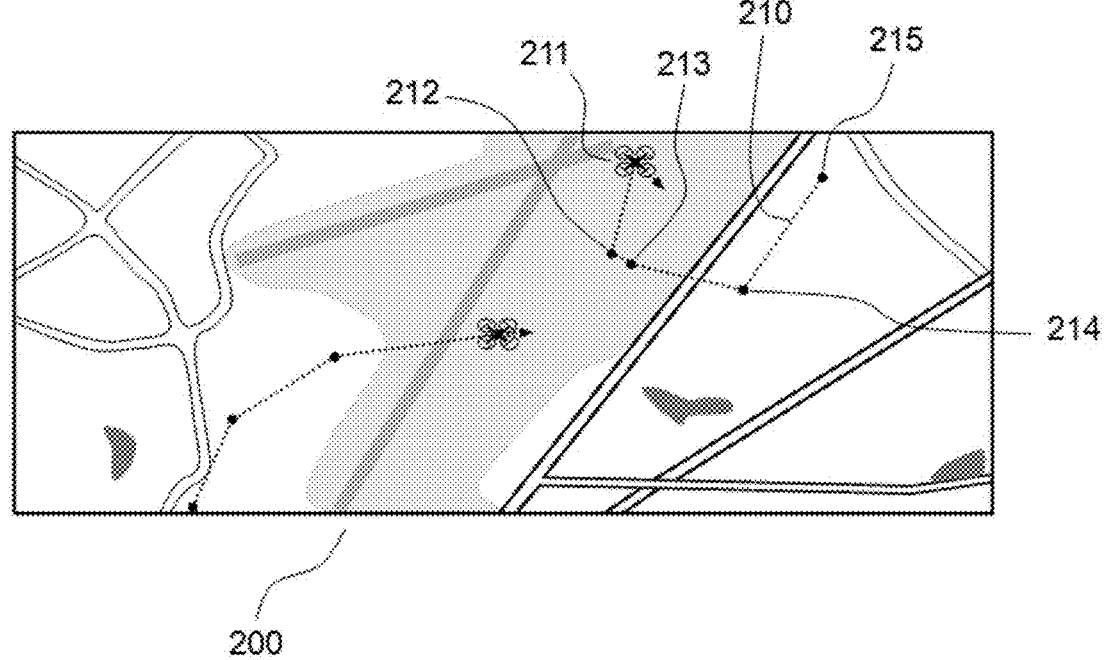
FIG. 2 shows one example of a human-machine interface allowing an operator to define an unmanned aerial vehicle trajectory, in a set of embodiments of the invention.

FIG. 2 shows one example of a human-machine interface allowing an operator to define an unmanned aerial vehicle trajectory, in a set of embodiments of the invention.

The graphical interface, or HMI, 200 allows a UAV operator to define a trajectory. The HMI shows a map of a geographical zone, above which the operator is able to define UAV trajectories, notably by entering waypoints on the map. For example, the user may define the trajectory 210 of the drone 211 by successively entering the waypoints 212, 213, 214 and 215 on the interface 200.

Once the trajectory has been defined, it may be sent to a UTM control system, which may verify that it does not generate any conflict, and where appropriate propose an optimum and safe alternative trajectory.

Figure 3:
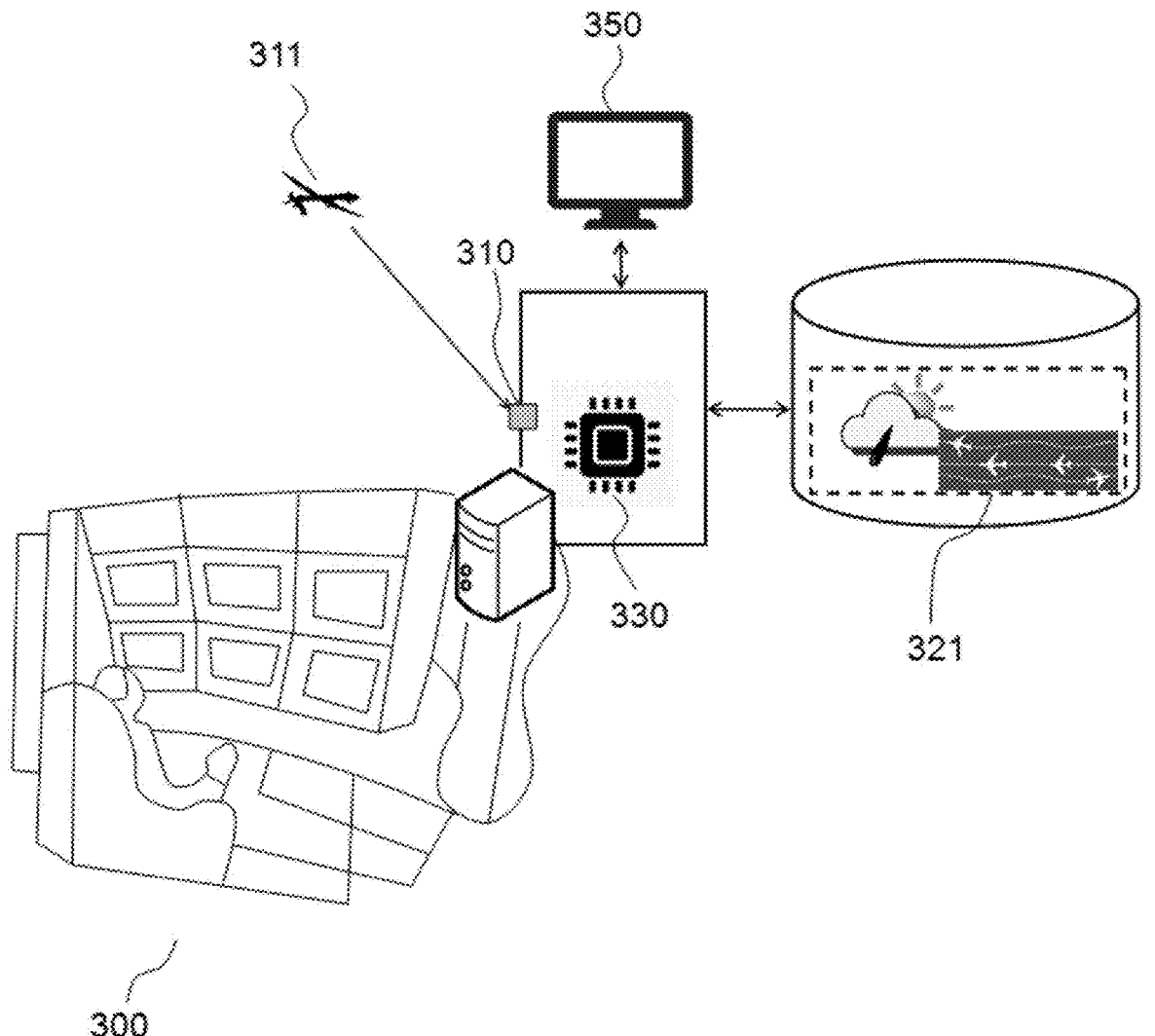
FIG. 3 shows a computing system, in a set of modes of implementation of the invention.

FIG. 3 shows a computing system, in a set of modes of implementation of the invention.

The computing system 300 may be implemented within a UTM air traffic management system. According to various embodiments of the invention, it may be fully autonomous, or else supervised by an operator such as an air traffic controller. Unlike a conventional ATM system, an operator of a UTM, if they exist, will essentially have a control function, but will not by default be involved in defining the trajectories.

The system 300 is a computing system. According to one set of embodiments of the invention, the system 300 may be a single computing device such as a desktop computer, a server, or any other system able to perform computations. The system 300 may also comprise a plurality of computing devices. For example, the system 300 may be a server farm comprising multiple computer servers.

The system 300 thus comprises at least one computing unit 330. The at least one computing unit 310 may be any type of computing unit able to perform computations. For example, the computing unit may be a processor configured with machine instructions, a microprocessor, an integrated circuit, a microcontroller, a programmable logic circuit, or any other computing unit able to be programmed to perform computing operations.

The system 300 comprises at least one communication port 310 able to communicate with an unmanned aerial vehicle (UAV) 311. This communication port may thus receive a trajectory request from the UAV 311 and communicate back an optimized trajectory to said UAV.

In one set of embodiments of the invention, the communication port 310 is also able to communicate with an operator of the UAV, for example with the interface 200. The communication port may thus for example receive a trajectory request from the interface 200, and send the optimized trajectory both to the UAV itself in order to follow the trajectory and to the interface 200 in order to display the optimized trajectory.

The at least one communication port 310 may also be used to receive various airspace information, such as the positions of the various aircraft, weather information, etc.

To this end, the at least one communication port 310 may be of various types: Internet connection, radio link, radars, etc. The invention is not limited to one type of communication port, and a person skilled in the art will be able to adapt the reception of the input parameters to the available input channels. Likewise, according to various modes of implementation of the invention, the various input and output parameters may be received on a single port, or a plurality of ports, of the same type or of different types. For example, aircraft trajectories may be received via radio link, and the weather information may be received via an Internet connection. The communication with UAVs may take place via a wireless link such as a 4G or 5G link.

The system 300 comprises an access point to at least one information storage medium 320. The at least one information storage medium 330 may be any type of storage able to store information: hard drive, CD, DVD, magnetic tape, a memory card, a USB key, a Flash memory, a random-access memory.

The information storage medium may be integrated into the system 300. For example, if the system 300 is a computing device such as a server, the information storage medium may be a hard drive of the device. If the system 300 consists of a plurality of computing devices, the at least one storage medium may be a set of memories distributed between the various computing devices.

The system 300 may also have access to the at least one information storage medium 330 via a connection. For example, the at least one information storage medium may consist of at least one hard drive accessed remotely, for example via at least one NAS server, or via a cloud-computing system.

The at least one information storage medium 330 stores a definition of a set of obstacles 321 in an airspace. The concept of an obstacle is defined here in the broad sense as being any element able to jeopardize the safety of the UAV, and needing to be avoided. An obstacle may for example consist of a relief, a building, hazardous weather, or the presence of another aircraft. To this end, the set of obstacles may comprise aircraft trajectories. The obstacles may be defined in fixed databases (for example relief and building databases), and/or may be received by way of the at least one communication port 310.

For example, the positions of the various UAVs in the airspace may be received by way of a 4G/5G network if the UAVs are equipped with SIM cards and geolocated by the 4G/5G network, but also by sensors such as radars. More generally, the system 300 receives the positions of the various aircraft in the airspace along with their evolution. This may be performed at regular intervals, for example every few seconds, and/or when events occur, such as the appearance of a UAV in the airspace, or a sudden change in heading of a UAV. This makes it possible to monitor the position of the aircraft with respect to the fixed and mobile obstacles. This makes it possible notably to ensure that the intended trajectories of the various aircraft do not come into conflict with one another, but also to automatically take the necessary measures in the event of an aircraft deviating from its intended trajectory: if the aircraft is a UAV, a new trajectory may be computed automatically; if the deviation risks leading to conflicts with other drone trajectories, these may be recomputed in order to avoid the conflict.

The aircraft trajectories may be expressed in various ways. For example, the trajectories may be expressed in the form of 4D trajectories, with waypoints defined by a latitude, longitude, and an FL and time of passage. The trajectories may also comprise an associated heading for each waypoint. A trajectory may also be associated with a type of airplane and/or a call sign (denomination of a given aircraft).

The weather information may notably comprise at least one of the following items of information: numerical information (temperatures, wind speeds and directions, pressures, etc.), for example in the form of a GRIB file, text describing the weather (for example, presence of a storm, thunderstorm, etc.), SIGMET messages. More generally, any type of data providing indications about the weather within the airspace may be used.

The at least one computing unit 330 is configured so as to provide the UAV that made a trajectory request with an optimum trajectory. To this end, the at least one computing unit 330 is configured so as to execute a method according to one of the embodiments of the invention, as defined in FIG. 4, in order to propose an optimum trajectory to the UAV.

The method for proposing an optimum trajectory to a UAV may for example be executed on the initiative:

Of the UAV itself;

Of an operator of the UAV;

Of the UTM itself, for example when a deviation of the UAV from its trajectory or the occurrence of a conflict (appearance of another UAV close to the trajectory for example) is detected.

The computing system 300 centralizes all of the aircraft trajectories, and in particular trajectories of drones in the airspace. The computing system may thus automatically propose an optimized trajectory to each UAV as soon as needed. This makes it possible to automatically optimize the drone trajectories, and to automatically resolve conflicts in the airspace, even when the number of drones in the airspace is very high.

Figure 4:
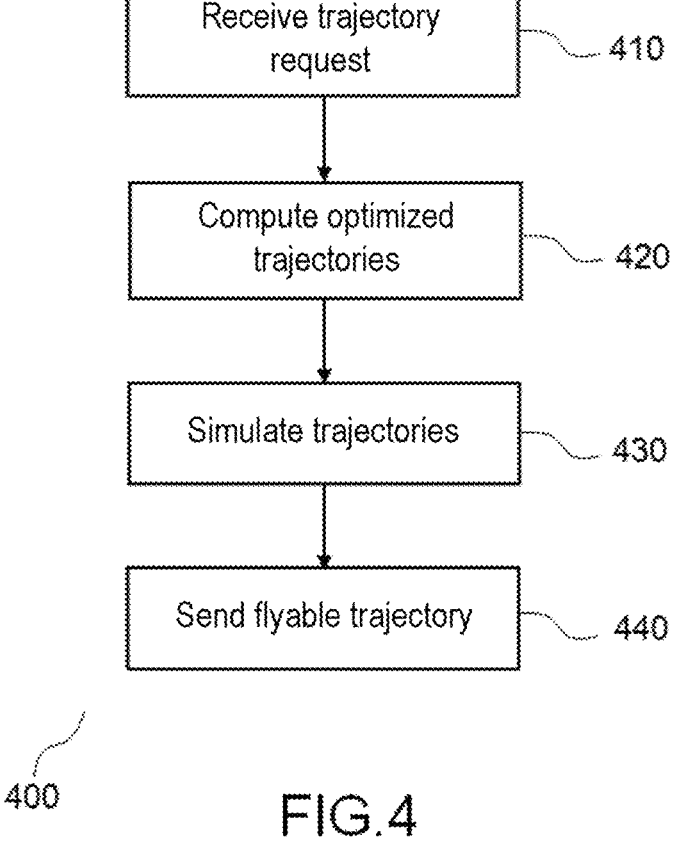
FIG. 4 shows a computer-implemented method, in a set of modes of implementation of the invention.

FIG. 4 shows a computer-implemented method in a set of modes of implementation of the invention.

The method 400 is a method that aims to automatically propose a flyable trajectory that is safe and as optimized as possible to UAVs in an airspace. The method 400 may be executed by a computing system such as the computing system 300 and/or in a UTM system.

The method 400 comprises a first step 410 of receiving a trajectory request from an unmanned aerial vehicle (UAV), said request comprising:

an initial point;

a final point;

at least one manoeuvrability parameter of the UAV.

A trajectory request may be received on the initiative:

Of the UAV itself;

Of an operator of the UAV;

Of the UTM itself, for example when a deviation of the UAV from its trajectory or the occurrence of a conflict (appearance of another UAV close to the trajectory for example) is detected.

In one set of embodiments of the invention, the at least one manoeuvrability parameter of the UAV comprises a speed and a maximum acceleration of the UAV.

In one set of embodiments of the invention, the at least one manoeuvrability parameter of the UAV may also comprise at least one parameter chosen from among:

A number of motors of the UAV;

A minimum speed of the UAV.

More generally, the at least one manoeuvrability parameter may comprise any parameter that has an impact on the flight capabilities of the UAV.

In one set of embodiments of the invention, the trajectory request also comprises a series of waypoints defining a target trajectory. This series of waypoints may for example take the form of 3D or 4D points, and may for example represent an initial target trajectory, defined for example via the interface 200, or corresponding to the current predicted trajectory of a UAV.

The desired trajectory may for example take the form of the following formalism:

```
" id " : " 2350_20190123i ",
" route " : [
{
" speed " : 453.0,
" timestamp " : 670,
" latitude " : 53.2331,
" longitude " : -3.0804,
" level " : 34000.0,
},
{
" speed " : 453.0,
" timestamp " : 751,
" latitude " : 53.2448,
" longitude " : -3.363
" level " : 34000.0,
},
...
```

In this formalism, a route or target trajectory of a UAV is defined by an identifier "id" and a series of successive waypoints, each waypoint being defined by a bracket, with the following parameters:

"speed": speed of the UAV at the waypoint, in knots;

"timestamp": time of passage through the waypoint;

"latitude": waypoint latitude, in degrees;

"longitude": waypoint longitude, in degrees;

"level": flight level of the UAV at the waypoint.

The method 400 then comprises a second step 420 of computing a plurality of optimized 4D trajectories between the initial point and the final point, complying with the at least one manoeuvrability parameter, and avoiding obstacles in an airspace, each 4D trajectory being associated with a performance score.

This step consists in practice in computing optimized 4D trajectories that avoid all of the obstacles identified in the airspace (i.e. terrain, buildings, weather, other aircraft, etc.) while complying with the manoeuvrability constraints.

A 4D trajectory may take the form of a succession of 4D waypoints (latitude, longitude, altitude/flight level, and time) defining the passage points of the UAV and the associated passage times. The waypoints may also be associated with flight information, such as speeds and accelerations of the UAV.

The 4D trajectories may be optimized in accordance with one or a combination of the following parameters:

minimizing a length of the trajectory while passing through a series of waypoints in a predefined order;

minimizing a number of manoeuvres of the UAV over the trajectory;

complying with the at least one manoeuvrability parameter;

avoiding obstacles in accordance with a criticality level, the encountering of an obstacle reducing the performance score associated with the trajectory, based on the criticality of the obstacle. Some obstacles may be impassable;

complying with a safety corridor around a target route. The safety corridor takes the form of a tube around the segments of a target route. The width of the safety corridor may depend on parameters such as the manoeuvrability parameters or wind speed. The width of the safety corridor may also be defined by the operator of the drone and/or the UTM.

The performance score may be computed based on the achievement/compliance level for the one or more selected parameters.

The step of computing the optimized 4D trajectories therefore consists in proposing 4D trajectories that as far as possible comply with a set of criteria, each 4D trajectory being associated with a performance score in accordance with the level of compliance with the criteria.

Numerous methods make it possible to optimize an aircraft trajectory in accordance with a set of criteria. In particular, one optimization method is described with reference to FIG. 5.

The method 400 then comprises a third step 430 of a flight simulator simulating said plurality of 4D trajectories, in order of decreasing performance score, until a 4D trajectory is considered to be flyable by the flight simulator.

This step consists in simulating the computed 4D trajectories. Specifically, even though the computation of the 4D trajectories takes into account the manoeuvrability parameters of the aircraft, a 4D trajectory thus obtained may in some cases not be flyable by the UAV. The simulation therefore makes it possible to ensure that a selected trajectory is ultimately actually flyable by the UAV.

To this end, the flight simulator takes the 4D trajectory and the at least one manoeuvrability parameter at input. If the 4D trajectory is actually flyable by the UAV, it will be accepted by the simulation. If not, it will be rejected. Accepting or rejecting the trajectory makes it possible to determine whether or not a given 4D trajectory will actually be flyable by the UAV.

Various types of flight simulator may be used. The 4D trajectories are simulated in order of decreasing performance score, until a 4D trajectory is considered to be flyable by the flight simulator.

In other words, the trajectories are ranked, from the one having the best performance score (the most optimized) to the one having the worst performance score (the least optimized). The first trajectory (the most optimized) is simulated first. If it is accepted by the simulator, and therefore flyable, it is selected as trajectory to be followed. If not (if it is rejected by the simulator, and therefore not flyable), the second most optimized trajectory is simulated in order to verify whether it is flyable. If this second trajectory is accepted by the simulator, and therefore flyable, it is selected as trajectory to be followed. If not, the 3rd most optimized trajectory is simulated, and so on until a flyable trajectory is identified.

The trajectory selected at the end of the simulations is thus the flyable trajectory that has the best performance score, that is to say the most optimized trajectory that the drone will actually be able to follow.

The method 400 then comprises a fourth step 440 of sending the trajectory considered to be flyable by the flight simulator to the unmanned aerial vehicle.

This step consists in sending the trajectory selected in step 430 to the UAV, that is to say the most optimized trajectory considered to be flyable by the UAV. The UAV may then follow the trajectory thus received.

The trajectory may be sent to the UAV by the at least one communication port 310, for example. For example, it may be sent by way of a 4G or 5G network.

The trajectory may be sent in the form of a series of 4D points, supplemented where appropriate by additional flight information (speed, acceleration at each point for example), or actions to be performed by the UAV.

The invention makes it possible to automatically propose a trajectory that is both safe with regard to known threats and optimized to any UAV in a space. The method may be executed automatically, and allows automated interaction with UAVs. The method according to the invention is therefore able to manage dense traffic of unmanned aircraft, regardless of the number of aircraft present.

The method according to the invention makes it possible to avoid medium-term conflicts between aircraft in an airspace.

The method 400 may then comprise a step of the UAV following the trajectory. This step consists in verifying that the UAV actually follows its trajectory, in terms both of position and of time, and that no hazard threatens the trajectory. For example, a safety corridor may be defined as a tube around the trajectory; if the UAV leaves the corridor, or if an obstacle enters it (for example, if another aircraft penetrates into the corridor), an alert may be raised, and the trajectory may be recomputed.

Once a 4D trajectory has been selected and sent to a UAV to be followed, this trajectory may be added to the obstacles 321 in order to compute the trajectories of other aircraft.

This makes it possible to obtain centralized management of the aircraft trajectories: as soon as a trajectory is optimized and sent to a UAV to be followed, it is integrated into the obstacles to be avoided by the other aircraft, in particular UAVs. This allows the optimization and the management of the aircraft trajectories to be centralized at a single point, and therefore allows global management of dense drone traffic.

The method according to the invention therefore allows centralized and safe management of the aircraft trajectories, including for unmanned aircraft, within an airspace, in which conflicts between aircraft are avoided in advance by optimizing the aircraft trajectories.

Figure 5:
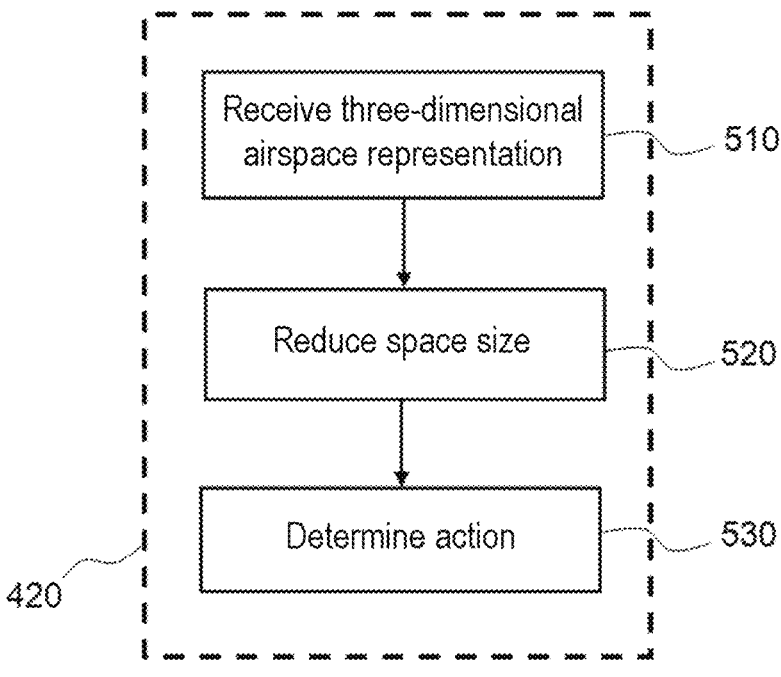
FIG. 5 shows one example of a method for computing an optimized 4D trajectory according to a set of modes of implementation of the invention.

FIG. 5 shows one example of a method for computing an optimized 4D trajectory according to a set of modes of implementation of the invention.

As used here, a scenario represents a set of flight plans with the identifiers and the categories of at least one aircraft.

Steps 510, 520 and 530 of the method that are shown in FIG. 5 correspond to possible sub-steps of step 420. The embodiments targeted in FIG. 5 furthermore provide a method for optimizing a 4D trajectory of a UAV for which a trajectory is to be computed, which will simply be called "the UAV", and at least one other aircraft in the airspace based on a three-dimensional representation of the airspace at the time when the method is executed.

In step 510, a three-dimensional representation of the airspace at the time of execution of the method is received.

In step 520, a smaller representation of the airspace may be determined by applying a recurrent autoencoder to the three-dimensional representation of the airspace at the time of execution of the method, the encoding of the airspace corresponding to the UAV and to the at least one other aircraft present in the airspace.

According to some embodiments, step 520 may comprise a sub-step, performed offline, for training the recurrent autoencoder using real data from flight plans of the UAV and of the at least one other aircraft, independently of the optimization of the trajectory.

According to some embodiments, the recurrent autoencoder may be trained using a back-propagation variant, such as the conjugate gradient method or the gradient algorithm.

According to some embodiments, the recurrent autoencoder may be an LSTM autoencoder.

In step 530, an action to be implemented by the UAV may be determined based on the smaller representation of the airspace and on information relating to the UAV and/or the at least one other aircraft in the airspace by applying a deep reinforcement learning algorithm.

According to some embodiments, the information relating to the UAV and/or the at least one other aircraft may comprise vertical distance, horizontal distance, and azimuth between the UAV and the at least one other aircraft, along with the category of the UAV and the position of the last named points.

According to some embodiments, the action to be implemented by the UAV may be chosen from a group comprising adjusting the speed of the UAV, changing the altitude of the UAV, changing the direction of the UAV with a return to the initial trajectory, the shortest route to a named point, waiting without taking any action.

According to some embodiments, the deep reinforcement learning algorithm may be designed to determine the optimum action from among all possible actions for optimizing trajectories while complying with a set of constraints or requirements comprising:

managing the three-dimensional airspace;

managing all types of possible actions for resolving air conflicts;

managing a variable number of aircraft of different categories and airlines;

optimizing the trajectory, and where appropriate resolving an air conflict taking into account nearby aircraft in order to avoid creating new air conflicts, and effectively resolving an air conflict while minimizing the detour taken following an action being taken, and taking into account scenarios and geometries of conflicts not encountered previously.

According to the embodiments of the invention, the model of the deep reinforcement learning algorithm may be defined by:

an autonomous agent corresponding to an aircraft, the autonomous agent having to learn the actions to be taken to resolve conflicts in the airspace based on experience so as to optimize a reward function over time;

the environment of the agent corresponds to a representation of the airspace described by a scenario, the agent being immersed in this environment and taking actions allowing it to interact and to change its environment and to change states;

the actions taken by an agent comprise all possible air traffic control actions able to be taken by an aircraft to resolve an air conflict, comprising changing direction, changing altitude, changing speed, the shortest route to a named point, and changing direction with a return to the initial trajectory.

According to some embodiments, the agent might not observe the entire environment, but only a few variables allowing it to evolve effectively in the environment. These variables may comprise the velocity, the position and the altitude of the agent and of all of the other aircraft present, along with information such as the air conflict to be resolved and the positions of the named points to which the agent is able to take a 'shortest route'.

In each time increment t of the reinforcement learning algorithm, the agent perceives its state $s_t \in S$ at the given time t and all of the possible actions $A(s_t)$. The agent chooses an action $a \in A(s_t)$ and receives, from the environment, a new state $s_{t+1}$ corresponding to the situation at the given time t+1 and a reward $R_{t+1}$. The decision on the action to be chosen by the agent is taken by a policy $\pi:S \to A$ that is a function that associates, in a manner conditional on a state, a selection probability with each action in this state. The purpose of the agent is to maximize the overall rewards that it receives from the environment during an episode, an episode comprising all of the states of the agent that are between an initial state and an end state. The value designated by Q-value and denoted Q(s,a) measures the overall reward expected if the agent is in the state $s \in S$ and performs the action a, and then continues to interact with its environment until the end of the current episode in accordance with a policy $\pi$.

According to some embodiments, the deep reinforcement learning algorithm may be trained beforehand to approximate a reward function for a given representation of the scenario in the airspace at the time of execution of the method, such that the action to be implemented by the UAV corresponds to the learned optimum strategy for maximizing the reward function. Training the reinforcement learning algorithm thus makes it possible to determine future cumulative sums (or overall rewards) that the agent is able to obtain for a given action and situation (or scenario). Following training and convergence of the reinforcement learning algorithm, the action that relates to the maximum reward function for the given current situation at the time of the conflict may be selected, and it represents the action that corresponds to the optimum strategy for optimizing the trajectory.

More generally, a plurality of actions corresponding to a plurality of candidate 4D trajectories may be selected, the value of the reward function giving the performance score associated with each candidate 4D trajectory. These various candidate 4D trajectories may then be simulated in step 430, in order of decreasing performance score (defined by the reward value for a given action/4D trajectory).

According to some embodiments, the reward function may be modelled beforehand so that the optimum strategy for maximizing the rewards corresponds to all of the constraints defined above. According to some embodiments, the reward function may be modelled so as to associate a value with each triplet comprising an air situation at a first given time t, an action taken at a given time t, and an air situation at a second given time t+1, the value reflecting the attractiveness of the triplet and being broken down into a plurality of penalties comprising:

a positive penalty if the action a taken at the given time t has resolved a conflict;

a negative penalty if the action a taken at the given time t has not made it possible to resolve a conflict or has led to at least one other air conflict;

a negative penalty if the action a taken at the given time t leads to a new trajectory that causes a detour;

a positive penalty if the action a taken at the given time t leads to a new shorter trajectory;

a negative penalty if the action a taken at the given time t makes it possible to resolve the air conflict and the resolution takes place close to the conflict; and a negative penalty that increases with the number of actions taken to resolve the air conflict.

A conflict may for example be generated as soon as a trajectory intersects a safety corridor of another aircraft, such as the safety corridors 140, 141, 142, or an obstacle such as the obstacles 150, 151, 152, 153, 154, 155 or 156.

In one set of embodiments, each obstacle is associated with a criticality level (the criticality level varying with the need to avoid the obstacle), and the sum of the negative penalty associated with a conflict with the obstacle depends on the criticality level of the obstacle.

In other words, a relatively non-critical obstacle (for example flying over a school or passing through an area of turbulence) may be associated with a low penalty. Encountering this obstacle will therefore incur a penalty, but is possible if it otherwise allows the trajectory to be significantly optimized, or makes it possible to avoid a more critical conflict. By contrast, a critical or even impassable obstacle (for example a safety corridor of another aircraft or a military base) will be associated with a significant or even prohibitive penalty, and should therefore not be passed through by the trajectory.

This allows close management of possible conflicts based on the criticality level of the conflicts.

According to some embodiments, the deep reinforcement learning algorithm may be trained beforehand using operational data and scenarios corresponding to all possible manoeuvres of the UAV, all possible actions for resolving an air conflict, and all possible categories of aircraft in conflict.

According to some embodiments, the deep reinforcement learning algorithm may be trained beforehand using realistic scenarios created automatically based on operational data and by augmenting the data for deep learning, for example by varying the categories of the aircraft and by adding delays to some aircraft in order to modify and add air conflicts.

According to some embodiments, the deep reinforcement learning algorithm may be a deep neural network implementing a reinforcement learning technique.

According to some embodiments, the deep reinforcement learning algorithm may be chosen from among the algorithms from the family of Q-learning algorithms or from the family of actor-critic algorithms.

The above examples demonstrate the ability of the invention to manage conflicts in an airspace containing numerous unmanned aircraft in a centralized manner. These examples are however given only by way of example and in no way limit the scope of the invention, which is defined in the claims below.

The invention claimed is:

1. A computer-implemented method implemented in air traffic control system controlling an airspace and comprising a computing system and at least one communication port, said air traffic control system having access to at least one information storage medium storing a definition of a set of fixed and mobile obstacles in the airspace, wherein the method comprising receiving airspace information through said at least one communication port, the method further comprising:

receiving a trajectory request through the at least one communication port from an unmanned aerial vehicle in an airspace, the airspace comprising a set of obstacles, each obstacle being associated with a criticality level, the criticality level associated with an obstacle varying with the need to avoid the obstacle by said unmanned aerial vehicle, said request comprising: an initial point; a final point; at least one maneuvrability parameter of the unmanned aerial vehicle, the at least one manoeuvrability parameter being a parameter that has an impact on the flight capabilities of the unmanned aerial vehicle;

computing, by the computing system a plurality of optimized 4D trajectories between the initial point and the final point, that comply with the at least one manoeuvrability parameter, each 4D trajectory being a succession of 4D waypoints, each defined by a latitude, a longitude, an altitude, and a time, each 4D trajectory being associated with a performance score, said performance score being determined at least by criticality levels associated with the obstacles from said airspace;

simulating, by a flight simulator each of said plurality of optimized 4D trajectories by decreasing order of the associated performance scores, until an optimized 4D trajectory is selected by the flight simulator, said simulation of each optimized 4D trajectory comprising determining, by the flight simulator, if said simulated optimized 4D trajectory is flyable, and if so selecting said flyable optimized 4D trajectory;

sending said selected optimized 4D trajectory to said unmanned aerial vehicle through said at least one communication port, to be followed by the unmanned aerial vehicle, the method comprising adding said selected optimized 4D trajectory into the set of obstacles and controlling the actual trajectory of the unmanned aerial vehicle, in response to the unmanned aerial vehicle applying said selected optimized 4D trajectory, wherein said step of computing a 4D trajectory of the plurality of optimized 4D trajectories comprises, at the time of execution of the method:

receiving a three-dimensional representation of the airspace;

determining a reduced representation of the airspace by applying a recurrent autoencoder to said three-dimensional representation of the airspace;

determining an action to be implemented by said unmanned aerial vehicle, by applying a deep reinforcement learning algorithm based on said reduced representation of the airspace and on information relating to said unmanned aerial vehicle and/or to at least one other aircraft in the airspace, an action corresponding to an optimized 4D trajectory, and wherein said deep reinforcement learning algorithm is trained beforehand in a training phase and is used to approximate a reward function for a given representation of a scenario in the airspace, at the time of execution of the method, said action corresponding to an optimum strategy that maximizes said reward function in a training phase, said reward function defining the performance score associated with the 4D trajectory, said scenario representing a set of flight plans of at least one aircraft.

2. The method according to claim 1, wherein the trajectory request comprises a series of waypoints defining a target route.

3. The method according to claim 1, wherein a 4D trajectory is optimized in accordance with one or a combination of the following parameters:

minimizing a length of the trajectory while passing through a series of waypoints in a predefined order;

minimizing a number of unmanned aerial vehicle manoeuvres over the trajectory;

complying with the at least one manoeuvrability parameter;

avoiding the obstacles in accordance with said criticality levels of the obstacles;

complying with a safety corridor around a target route.

4. The method according to claim 1, comprising adding the trajectory considered to be flyable to the obstacles in order to compute the trajectory of other aircraft in the airspace.

5. The method according to claim 1, wherein said reward function associates a value with each triplet comprising an air situation at a first given time, and an air situation at a second given time, an action taken between said first given time and said second given time, said value being broken down into a plurality of penalties comprising:

a positive penalty if said action taken has resolved a conflict, or a negative penalty if said action taken has not made it possible to resolve a conflict or has led to at least one other air conflict;

a negative penalty if said action taken leads to a new trajectory that causes a detour;

a positive penalty if said action taken leads to a new shorter trajectory;

a negative penalty if said action taken makes it possible to resolve a conflict and the resolution takes place close to the conflict;

a negative penalty that increases with the number of actions taken to resolve a conflict.

6. The method according to claim 5, wherein the negative penalty if said action taken has not made it possible to resolve a conflict or has led to at least one other air conflict depends on the criticality of said conflict or of said other air conflict.

7. A computer program product comprising program code instructions for executing the steps of the method according to claim 1 when said program is executed on a computer.

8. The method according to claim 1, wherein the deep reinforcement learning algorithm has a model defined by:

an autonomous agent learning actions to be taken to optimize the reward function over time;

an environment of said agent corresponding to a representation of the airspace described by a scenario, the actions taken by the agent.

9. The method of claim 8, wherein the agent is adapted to observe variables allowing it to evolve in said environment.

10. The method of claim 8, wherein in each time t increment t of the reinforcement learning algorithm, the agent perceives its state $s_t \in S$ at the given time t and the possible actions $A(s_t)$, the agent being adapted to choose an action $a \in A(s_t)$ and receive, from the environment, a new state $s_{t+1}$ corresponding to the situation at the given time t+1 and a reward $R_{t+1}$, the decision on the action to be chosen by the agent being taken by a function that associates a selection probability with each action in the state.

11. The method of claim 10, wherein the agent is adapted to maximize the overall rewards that it receives from the environment during an episode, an episode comprising all of the states of the agent that are between an initial state and an end state.

12. An air traffic control system for controlling an airspace comprising a computing system and at least one communication port, said air traffic control system having access to at least one information storage medium storing a definition of a set of fixed and mobile obstacles in the airspace, wherein airspace information are received by the computing system through said at least one communication port, the computing system being adapted to:

receive a trajectory request through the at least one communication port from an unmanned aerial vehicle in an airspace comprising a set of obstacles, each obstacle being associated with a criticality level, the criticality level associated with an obstacle varying with the need to avoid the obstacle by said unmanned aerial vehicle, said request comprising: an initial point; a final point; at least one manoeuvrability parameter of the unmanned aerial vehicle, the at least one manoeuvrability parameter being a parameter that has an impact on the flight capabilities of the unmanned aerial vehicle;

compute a plurality of optimized 4D trajectories between the initial point and the final point, that comply with the at least one manoeuvrability parameter, each 4D trajectory being a succession of 4D waypoints, each defined by a latitude, a longitude, an altitude, and a time, each 4D trajectory being associated with a performance score, said performance score being determined at least by criticality levels associated with the obstacles from said airspace;

the air traffic control system further comprising a flight simulator for simulating each of said plurality of optimized 4D trajectories by decreasing order of the associated performance scores, until an optimized 4D trajectory is selected by the flight simulator, said simulation of each optimized 4D trajectory comprising determining, by the flight simulator, if said simulated optimized 4D trajectory is flyable, and if so selecting said flyable optimized 4D trajectory;

the computing system being adapted to send said selected optimized 4D trajectory to said unmanned aerial vehicle through said at least one communication port, to be followed by the unmanned aerial vehicle, the system comprising controlling the actual trajectory of the unmanned aerial vehicle, in response to the unmanned aerial vehicle applying said selected optimized 4D trajectory and adding said selected optimized 4D trajectory into the set of obstacles, the system being configured to add said selected optimized 4D trajectory into the set of obstacles and to control the actual trajectory of the unmanned aerial vehicle, in response to the unmanned aerial vehicle applying said selected optimized 4D trajectory, wherein the computing system is configured to:

compute a 4D trajectory of the plurality of optimized 4D trajectories comprises, at the time of execution of the method:

receive a three-dimensional representation of the airspace;

determine a reduced representation of the airspace by applying a recurrent autoencoder to said three-dimensional representation of the airspace;

determine an action to be implemented by said unmanned aerial vehicle, by applying a deep reinforcement learning algorithm based on said reduced representation of the airspace and on information relating to said unmanned aerial vehicle and/or to at least one other aircraft in the airspace, an action corresponding to an optimized 4D trajectory, wherein said deep reinforcement learning algorithm is trained beforehand in a training phase and is used to approximate a reward function for a given representation of a scenario in the airspace, at the time of execution of the method, said action corresponding to an optimum strategy that maximizes said reward function in a training phase, said reward function defining the performance score associated with the 4D trajectory, said scenario representing a set of flight plans of at least one aircraft.

* * * * *